United States Patent
Konduru (10) Patent No.: US 8,928,351 B1
(45) Date of Patent: Jan. 6, 2015

(54) EMULATING POWER DOMAINS IN AN INTEGRATED CIRCUIT USING PARTIAL RECONFIGURATION

(71) Applicant: Xilinx, Inc., San Jose, CA (US)

(72) Inventor: Samskrut J. Konduru, Union City, CA (US)

(73) Assignee: Xilinx, Inc., San Jose, CA (US)

( * ) Notice: Subject to any disclaimer, the term of this patent is extended or adjusted under 35 U.S.C. 154(b) by 143 days.

(21) Appl. No.: 13/801,884

(22) Filed: Mar. 13, 2013

(51) Int. Cl.
*H03K 19/173* (2006.01)
*H03K 19/177* (2006.01)
*G06F 17/50* (2006.01)

(52) U.S. Cl.
CPC ...... *H03K 19/17748* (2013.01); *G06F 17/5054* (2013.01)
USPC .................................. 326/38; 326/41; 326/94

(58) Field of Classification Search
None
See application file for complete search history.

(56) References Cited

U.S. PATENT DOCUMENTS

| | | | | |
|---|---|---|---|---|
| 5,452,239 | A * | 9/1995 | Dai et al. ......................... | 703/19 |
| 6,321,366 | B1 * | 11/2001 | Tseng et al. ..................... | 326/94 |
| 7,539,489 | B1 * | 5/2009 | Alexander ...................... | 455/423 |
| 7,902,866 | B1 * | 3/2011 | Patterson et al. ................ | 326/41 |
| 8,415,974 | B1 * | 4/2013 | Lysaght ........................... | 326/39 |
| 2009/0251867 | A1 * | 10/2009 | Sharma et al. ................. | 361/737 |

OTHER PUBLICATIONS

Eve Corp., "Power Gating in Emulation," *Eve Corporation—Hot Verification News*, Jan. 14, 2013, pp. 1-2, vol. 7, Issue 3, pp. 1-3, http://www.updatefrom.com/eve_corp/2012_q3/design_center.asp.
Larzul, Ludovic, "Power-aware emulation tests power islands," *EE Times*, Jun. 4, 2012, pp. 1-8, http://www.eetimes.com/design/eda-design/4374480/Power-aware-emulation-tests-power-islands.
Rizzati, Lauro, "Power Is on Everybody's Mind," *SOCcentral*, Jun. 29, 2012, 1 page, http://www.soccentral.com/results.asp?CatID=488&EntryID=38773.
Shearer, Findlay, "Low power design techniques," *EDN Network*, Jul. 24, 2012, pp. 1-7, http://www.edn.com/design/systems-design/4391038/Low-power-design-techniques.

* cited by examiner

*Primary Examiner* — Crystal L Hammond
(74) *Attorney, Agent, or Firm* — Kevin T. Cuenot (57) ABSTRACT

Testing power domains of a circuit design includes correlating, using a processor, a selected power domain of a circuit design having a plurality of power domains with a partial reconfiguration partition and implementing the circuit design within an integrated circuit. The partial reconfiguration partition is implemented within a reconfigurable region of the integrated circuit. A power off state for the selected power domain of the circuit design is emulated by partially reconfiguring the reconfigurable region of the integrated circuit.

20 Claims, 5 Drawing Sheets

EMULATING POWER DOMAINS IN AN INTEGRATED CIRCUIT USING PARTIAL RECONFIGURATION

TECHNICAL FIELD

This specification relates to integrated circuits (ICs) and, more particularly, to emulating power domains in an IC using partial reconfiguration.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and the like.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs also can be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

As ICs become larger and more complex, the devices consume larger amounts of power. In many applications, particularly mobile applications, power consumption is nearly as great of a concern as performance. In some cases, power consumption is more of a concern. One way of addressing power consumption is to create one or more power domains. Within an IC having multiple power domains, one power domain can be powered down when not needed while other power domains continue to operate, thereby reducing power consumption of the overall IC. Different power domains are turned on and off as needed as the IC continues to operate.

While the advent of power domains can significantly reduce power consumption of an IC, power domains also add complexity to testing and verification. Not only must the IC function as intended when all power domains are powered on, but the IC must continue to perform as intended as various ones of the power domains are power cycled during operation. Testing such a circuit design under the conditions described is a difficult and time consuming task.

SUMMARY

A method includes correlating, using a processor, a selected power domain of a circuit design having a plurality of power domains with a partial reconfiguration partition and implementing the circuit design within an integrated circuit (IC). The partial reconfiguration partition is implemented within a reconfigurable region of the IC. The method further includes emulating a power off state for the selected power domain of the circuit design by partially reconfiguring the reconfigurable region of the IC.

An integrated circuit includes a configuration controller that loads, within the IC, a configuration bitstream for a circuit design. The IC further includes a reconfigurable region having programmable circuitry that is programmed by the configuration controller to implement circuitry of a power domain specified by the configuration bitstream. The configuration controller emulates a power off state for the power domain of the circuit design by partially reconfiguring the reconfigurable region of the IC.

A system includes an IC having a reconfigurable region including programmable circuitry. The system further includes a configuration controller coupled to the IC that loads, within the IC, a configuration bitstream for a circuit design. The reconfigurable region is programmed by the configuration controller to implement circuitry of a power domain specified by the configuration bitstream. The configuration controller emulates a power off state for the power domain of the circuit design by partially reconfiguring the reconfigurable region of the IC.

DETAILED DESCRIPTION

While the specification concludes with claims defining novel features, it is believed that the various features disclosed within this specification will be better understood from a consideration of the description in conjunction with the drawings. The process(es), machine(s), manufacture(s) and any variations thereof described within this specification are provided for purposes of illustration. Specific structural and functional details disclosed within this specification are not to be interpreted as limiting, but merely as a basis for the claims and as a representative basis for teaching one skilled in the art to variously employ the features described in virtually any appropriately detailed structure. Further, the terms and phrases used within this specification are not intended to be limiting, but rather to provide an understandable description of the features described.

This specification relates to integrated circuits (ICs) and, more particularly, to emulating power domains in an IC using partial reconfiguration. In accordance with the inventive arrangements disclosed within this specification, power domains of a circuit design for an electronic system can be correlated with partial reconfiguration partitions. Each partial reconfiguration partition is associated with one or more partial configuration bitstreams intended to emulate a particular state of the power domain such as powered, unpowered, or the like.

Once the IC is loaded with a configuration bitstream implementing the circuit design, operation of a selected power domain in terms of being powered on and/or off is emulated by loading, into the IC, a selected partial configuration bitstream for the partial reconfiguration partition correlated with the selected power domain. The selected partial configuration bitstream reconfigures a reconfigurable region of the IC that also corresponds to the selected power domain. In an actual implementation of the circuit design, a power controller generates power domain control signals that control power cycling of the power domains. Using emulation as described, a configuration controller that controls configuration and partial reconfiguration of the IC effectively replaces, and functions as, the power controller for the purpose of emulating power domain operation.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
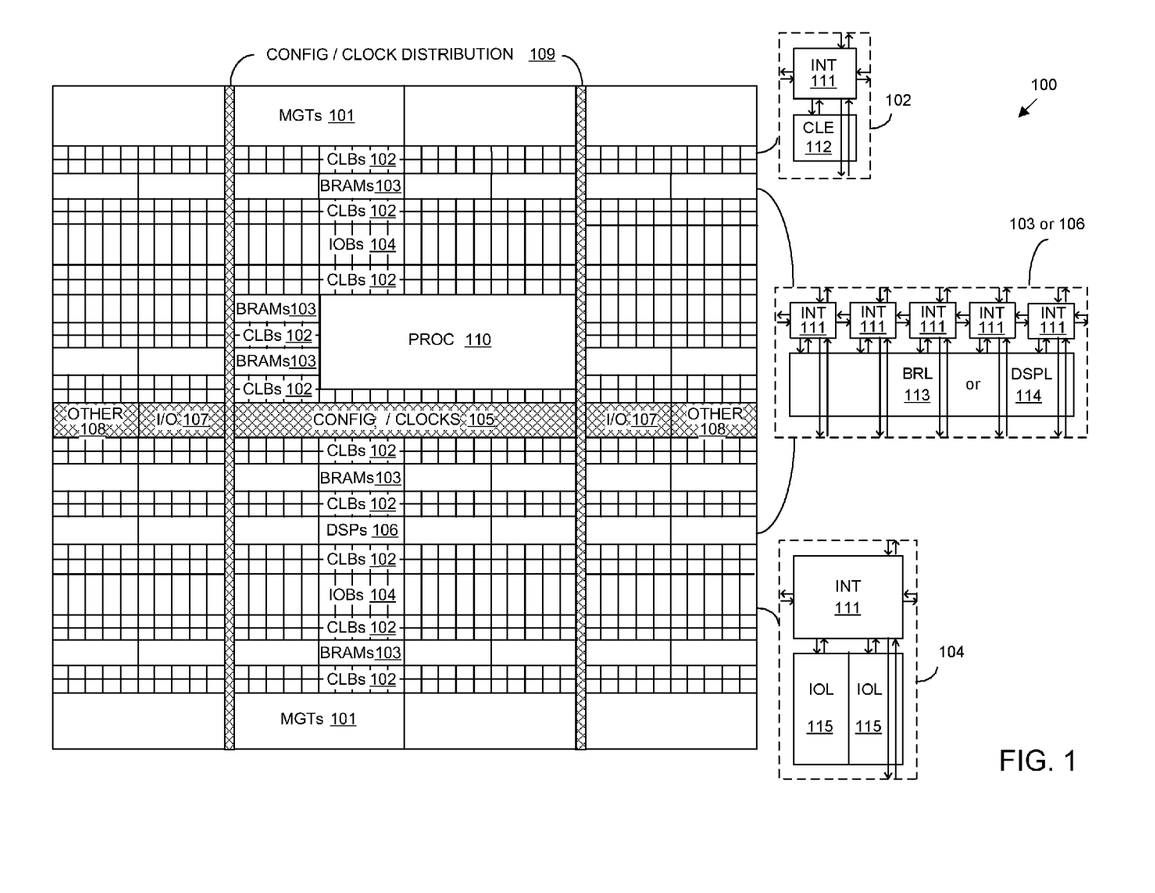
FIG. 1 is a block diagram illustrating an exemplary architecture for an integrated circuit (IC).

FIG. 1 is a block diagram illustrating an exemplary architecture 100 for an IC. In one aspect, architecture 100 can be implemented within a field programmable gate array (FPGA) type of IC. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured example, a BRAM tile has the same height as five CLBs, but other numbers (e.g., four) also can be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die, e.g., formed of regions 105, 107, and 108, can be used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100 and replaced with one or more of the other varieties of the programmable blocks described. Further, such blocks can be utilized to form a "soft processor" in that the various blocks of programmable circuitry can be used to form a processor that can execute program code as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 103, INTs 111, and BRAMs 103 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 110 within the IC are for purposes of illustration only and are not intended to be limiting of the examples provided within this specification.

Figure 2:
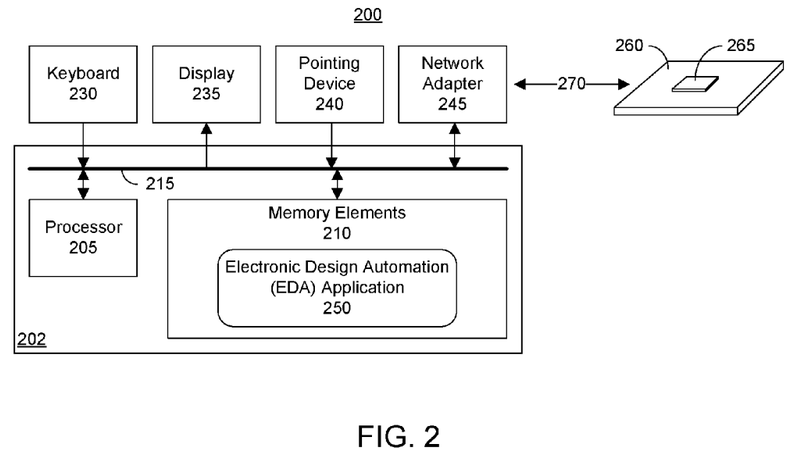
FIG. 2 is a block diagram illustrating an exemplary emulation system.

FIG. 2 is a block diagram illustrating an exemplary emulation system 200. Emulation system 200 includes a data processing system 202 and an emulation platform 260. Emulation platform 260 is communicatively linked with data processing system 202 by a communication channel 270.

As pictured, data processing system 202 includes at least one processor, e.g., a central processing unit (CPU), 205 coupled to memory elements 210 through a system bus 215 or other suitable circuitry. Data processing system 202 can store program code within memory elements 210. Processor 205 executes the program code accessed from memory elements 210 via system bus 215. In one aspect, data processing system 202 is implemented as a computer that is suitable for storing and/or executing program code. It should be appreciated, however, that data processing system 202 can be implemented in the form of any system including a processor and memory that is capable of performing the functions described within this specification.

Memory elements 210 include one or more physical memory devices such as, for example, local memory and one or more bulk storage devices. Local memory refers to random access memory or other non-persistent memory device(s) generally used during actual execution of the program code. Bulk storage device(s) can be implemented as a hard disk drive (HDD), solid state drive (SSD), or other persistent data storage device. Data processing system 202 also can include one or more cache memories (not shown) that provide temporary storage of at least some program code in order to reduce the number of times program code must be retrieved from the bulk storage device during execution.

Input/output (I/O) devices such as a keyboard 230, a display 235, and a pointing device 240 optionally can be coupled to data processing system 202. The I/O devices can be coupled to data processing system 202 either directly or through intervening I/O controllers. A network adapter 245 also can be coupled to data processing system 202 to enable data processing system 202 to become coupled to other systems, computer systems, remote printers, and/or remote storage devices through intervening private or public networks. Modems, cable modems, Ethernet cards, and wireless transceivers are examples of different types of network adapter 245 that can be used with data processing system 202.

As pictured in FIG. 2, memory elements 210 can store an electronic design automation (EDA) application 250. EDA application 250, being implemented in the form of executable program code, is executed by processor 205 and, as such, data processing system 202. Accordingly, EDA application 250 is considered part of data processing system 202. EDA application 250, in general, operates upon a received circuit design to facilitate emulation of power domains of the circuit design through partial reconfiguration of an IC. EDA application 250 and any data items utilized by data processing system 202, including circuit designs regardless of programmatic form, are functional data structures that impart functionality when employed as part of data processing system 202. A circuit design or other hardware description, e.g., hardware description language, a netlist, a configuration bitstream, or a partial configuration bitstream, is understood to be a functional data structure that imparts functionality when employed within an appropriate IC.

Emulation platform 260 can be implemented as a circuit board or other physical structure configured to host, or receive, an IC 265. IC 265 includes at least some programmable circuitry that is configurable to implement different physical circuits. In one aspect, IC 265 is implemented using an architecture the same as, or similar to, that described with reference to FIG. 1. For example, IC 265 can be implemented as an FPGA that is capable of implementing partial reconfiguration.

Partial reconfiguration is the modification of an operational IC such as IC 265 by loading a partial configuration bitstream. After IC 265 is configured using a configuration bitstream, i.e., a full configuration bitstream, one or more partial configuration bitstreams can be loaded into IC 265 as needed or desired. Each partial configuration bitstream modifies a reconfigurable region of IC 265 without compromising the integrity or operation of other regions or circuits of IC 265 that are not to be modified and that continue to operate within IC 265 as the reconfigurable region is modified.

Data processing system 202 is configured to operate upon a circuit design that includes two or more power domains to prepare the circuit design for emulation during which powering on and/or off of power domains is emulated through partial reconfiguration. Data processing system 202 can generate the configuration bitstream specifying the circuit design and any partial configuration bitstreams necessary and send the files to emulation platform 260 and IC 265 via communication channel 270. The particular implementation (e.g., physical structure and/or medium) of communication channel 270 will vary in accordance with the particular implementation of network adapter 245 or other interface used by data processing system 202 to communicate with platform 260 and/or IC 265.

In one aspect, one or more configuration bitstream(s) and/or one or more partial configuration bitstream(s) can be provided from data processing system 202 to emulation platform 260 and stored in a memory (not shown) mounted and/or coupled to emulation platform 260. A configuration controller, which can be within IC 265 or located on emulation platform 260, can load the configuration bitstream(s) and/or partial configuration bitstream(s) into IC 265 as described within this specification.

Figure 3:
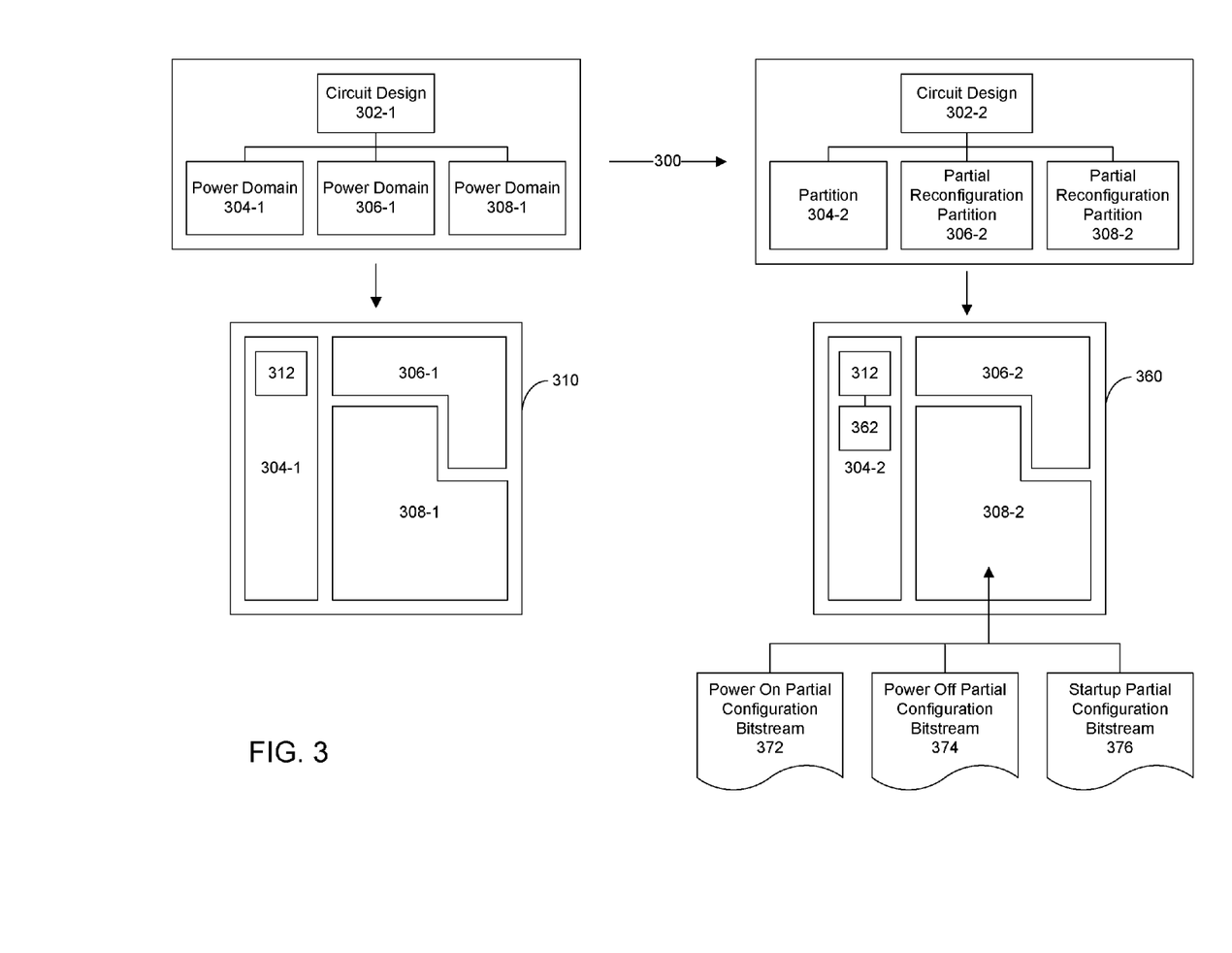
FIG. 3 is a block diagram illustrating an exemplary technique for emulating power domains of a circuit design using partial reconfiguration.

FIG. 3 is a block diagram illustrating an exemplary technique for emulating power domains of a circuit design using partial reconfiguration. More particularly, FIG. 3 illustrates an emulation preparation process 300 that can be performed by a data processing system such as data processing system 202 of FIG. 2. The data processing system operates upon a circuit design having two or more power domains to emulate power cycling of the power domains through partial reconfiguration.

FIG. 3 illustrates a circuit design 302-1. Circuit design 302-1 is shown in a hierarchical organization and includes a plurality of different power domains pictured as power domains 304-1, 306-1, and 308-1. A power domain is a collection of one or more components of a circuit design that are powered on and/or off under the same set of conditions concurrently as a group during operation of an IC. A circuit design can include two or more power domains. Each power domain can be powered on or off per system requirements independently of each other power domain, unless the circuit design requires otherwise.

In some cases, one of the power domains is static. A static power domain refers to a collection of one or more components that remain powered on during operation of the IC and, as such, are not powered off. A power controller is a circuit that is responsible for turning power on and/or off for the power domains. In some cases, the power controller is formed of circuitry, i.e., not a processor that executes program code, that implements a state machine to control the power domains. In other cases, the power controller is implemented as a processor that executes program code.

In either case, the power controller generates signals referred to herein as "power domain control signals." Power domain control signals generally are provided to switches that turn power on or off for a given power domain. In this manner, the power controller dictates which power domains are to be powered on and which are to be powered off at any given time. In some cases, the power controller is not located on the same IC as the power domains that are being controlled. As such, the power domain control signals from the power controller are provided to switches that may be external to the IC or switches within the IC. In other cases, the power controller is located on the same IC as the power domains. If the power controller is located on the same IC as the power domains that are being controlled, the power controller typically is implemented within the static power domain. The power domain control signals generated by the power controller are entirely "on-chip" within the IC.

As pictured in FIG. 3, when circuit design 302-1 is implemented in, or as, an IC 310, power domains 304-1, 306-1, and 308-1 are implemented on IC 310. In one example, IC 310 is an application specific IC or ASIC. As shown, each power domain of circuit design 302-1 corresponds to a physical region of IC 310. For purposes of illustration, power domain 304-1 is considered to be a static power domain and, as such, includes an on-chip power controller 312.

A data processing system, as described with reference to FIG. 2, performs an emulation preparation process 300 upon circuit design 302-1 that allows the power domains to be emulated using partial reconfiguration. As shown, circuit design 302-1 is transformed into circuit design 302-2. In circuit design 302-2, each of power domains 304-1, 306-1, and 308-1 is transformed, or correlated with a partition of the circuit design 302-2. In one aspect, the static power domain is correlated with a static partition of the circuit design that does not undergo partial reconfiguration. The power domains that are powered on and/or off (e.g., are power cycled) are referred to as dynamic power domains and are correlated with partial reconfiguration partitions.

For example, power domain 304-1 corresponds to partition 304-2. In the case where power domain 304-1 is a static power domain, partition 304-2 is not subject to partial reconfiguration. Power domain 306-1 corresponds to partition 306-2. Since power domain 306-1 is a dynamic power domain, partition 306-2 is a partial reconfiguration partition. Power domain 308-1 corresponds to partition 308-2. Since power domain 308-1 is a dynamic power domain, partition 308-2 is a partial reconfiguration partition. The data processing system can perform the necessary translation operation to generate circuit design 302-2.

When circuit design 302-2 is implemented within IC 360, each partition is implemented in a particular region of IC 360. IC 360 can be implemented as a programmable IC such as an FPGA. Accordingly, when circuit design 302-2 is loaded into IC 360 as a configuration bitstream, each partition occupies a particular region of IC 360. A region is a physical area of an IC. Thus, partition 304-2 is implemented within region 304-2 of IC 360. Partial reconfiguration partition 306-2 is implemented within reconfigurable region 306-2 of IC 360. Partial reconfiguration partition 308-2 is implemented within reconfigurable region 308-2.

In one aspect, one or more of the partial reconfiguration partitions of circuit design 302-2 are associated with one or more partial configuration bitstreams. For example, partial reconfiguration partition 308-2 is associated with circuitry that is implemented within reconfigurable region 308-2 by the initial configuration bitstream loaded into IC 360. In one aspect, the configuration bitstream can be considered, for purposes of explanation, to include a plurality of partial configuration bitstreams that, taken collectively, form the initial configuration bitstream. In this regard, the portion of the configuration bitstream initially loaded into IC 360 that configures reconfigurable region 308-2 can be considered a "power on partial configuration bitstream" as the circuitry in reconfigurable region 308-2 is in a power on state.

For purposes of discussion, a power on partial configuration bitstream 372 is illustrated. In one aspect, power on partial configuration bitstream 372 is considered a part of the initial configuration bitstream. In another aspect, power on partial configuration bitstream 372 is a separate and standalone partial configuration bitstream that can be used at any point to partially reconfigure reconfigurable region 308-2 back to its original power on state, e.g., after being reconfigured to emulate a power off state or a startup process and/or a startup fault condition. Thus, power on partial configuration bitstream 372 implements identical circuitry and state in reconfigurable region 308-2 as does the initial configuration bitstream. In any case, as shown, partial reconfiguration partition 308-2 is also associated with a power off partial configuration bitstream 374, and a startup partial configuration bitstream 376.

When IC 360 is initially configured with the configuration bitstream, power on partial configuration bitstream 372 is included within the configuration bitstream and is implemented within reconfigurable region 308-2. The circuitry implemented within reconfigurable region 308-2 is initially in a powered on state and is operational. IC 360, for example, is an accurate representation of IC 310 albeit in a programmable IC as opposed to an ASIC.

To emulate a power off state in reconfigurable region 308-2, power off partial configuration bitstream 374 is loaded into IC 360. Power remains on in reconfigurable region 308-2. Loading power off partial configuration bitstream 374 into IC 360 implements different circuit structure within reconfigurable region 308-2. In one aspect, the circuit structure implemented in reconfigurable region 308-2 by power off partial configuration bitstream 374 is not functional. For example, power off partial configuration bitstream 374 is a blank partial configuration bitstream. It should be appreciated that in generating partial reconfiguration partitions, the data processing system inserts any required isolation circuits that ensure uninterrupted operation of circuits that are connected to reconfigurable region 308-2 when power off partial configuration bitstream 374 is loaded. Thus, once power off partial configuration bitstream 374 is loaded into configurable region 308-2, configurable region 308-2 is not operational as would be the case were power domain 308-1 to be powered off.

When power domain 308-1 is powered on, one or more memory elements in the circuitry of power domain 308-1 may store unknown values for a period of time. Memories can include actual BRAM elements, registers, flip-flops, etc. Typically, after power is applied to power domain 308-1, an initialization process is performed that places the memory elements of power domain 308-1 into the state that existed prior to powering off or otherwise places the memory elements in a known state. The time between application of power to power domain 308-1 after being powered off and completion of the initialization process is referred to as a startup process. During the startup process, memory elements of power domain 308-1 may store unknown values. If the values are permitted to propagate to other circuits and/or regions of IC 310, their effect is unknown and may induce errors. For that reason, isolation circuits are utilized within IC 310 that keep power domain 308-1 electrically isolated from other circuits and regions. After the initialization process is complete, the isolation circuits allow power domain 308-1 to be electrically connected or communicatively linked with other circuits or regions of IC 310.

If the isolation circuits within IC 310 do not function as intended while power domain 308-1 is being powered back on before the initialization process completes, the data stored in the memory elements of power domain 308-1 may propagate to regions. The situation in which an isolation circuit does not operate as intended during the startup process is referred to as a startup fault condition within this specification and can be emulated using IC 360.

The unknown state of the memory elements of power domain 308-1 during the startup process is emulated by loading startup partial reconfiguration bitstream 376 into IC 360. Startup partial reconfiguration bitstream 376 can be substantially similar to that of power on partial configuration bitstream 372 with one or more exceptions relating to values stored in one or more memory elements. For example, startup partial reconfiguration bitstream 376 and power on partial configuration bitstream 372 specify identical circuitry or circuit structures. The difference between startup partial configuration bitstream 376 and power on partial configuration bitstream 372 is that one or more or all of the values stored in one or more or all of the memory elements located within reconfigurable region 308-2 differ. More particularly, the value(s) of the memory element(s), as specified by startup partial configuration bitstream 376 have been modified from those originally specified in power on partial configuration bitstream 372.

In one aspect, one or more or all of the values stored in one or more or all of the memory elements of startup partial reconfiguration bitstream 376 can be randomized, i.e., randomly selected. In another aspect, one or more or all values stored in one or more or all of the memory element can be set to zero according to user preferences and/or inputs. One or more or all values stored in one or more or all of the memory elements can be set to one according to user preferences and/or inputs. In either case, whether the values are randomly selected or deliberately chosen, such decision is made during bitstream generation. For example, a user can specify one or more or all values of one or more or all memory elements as a user input to the data processing system. Such value(s) can be used within startup partial configuration bitstream 376 and, upon loading startup partial configuration bitstream into configuration memory, loads the values into the memory elements. In another example, the data processing system can randomly select one or more or all values, e.g., using a random number generator or other randomization function, of one or more or all of the memory elements and incorporate such values into startup partial configuration bitstream 376.

Once IC 360 is loaded with startup partial configuration bitstream 376, operation of IC 360 continues. Isolation circuits implemented within IC 360 at the boundary between reconfigurable region 308-2 and each other neighboring region begin to pass signals. Configurable region 308-2 now includes circuitry that is the same as was initially implemented by the configuration bitstream with the exception of one or more values in one or more memory elements. Because the memory elements of reconfigurable region 308-2 store values as described, emulation of a startup fault condition for power domain 308-1, or any other desired power domain, is achieved. A designer can observe the effect of having the randomized or particular values stored in the designated memory elements of reconfigurable region 308-2 propagate to other regions as would be the case were one or more isolation circuits for power domain 308-1 to malfunction.

It should be appreciated that the isolation circuits within IC 360 are required for partial reconfiguration to occur. Isolation circuits within IC 360, as created or inserted within the circuit design by the data processing system, are not the same as or representative of isolation circuits of IC 310. Isolation circuits in IC 360 must operate correctly for accurate emulation. By comparison, startup partial configuration bitstream 376 emulates the malfunction of isolation circuits in IC 310 referred to as the startup fault condition.

In one aspect, one or more or all partial reconfiguration partitions, and as such each reconfigurable region, can be associated with a power on partial configuration bitstream, a power off partial configuration bitstream, and one or more different startup partial configuration bitstreams. Thus, any of a variety of different situations can be emulated.

As discussed, power controller 312 controls when each of power domains 306-1 and 308-1 is powered on or off within IC 310. Within IC 360, a configuration controller 362 is used to control when each of reconfigurable regions 306-2 and 308-2 is reconfigured. Further, configuration controller 362 selects the particular partial configuration bitstream that is used. For each configurable region, a power off partial configuration bitstream can be selected for a power off condition to emulate a power off state, a startup partial configuration bitstream can be selected for a power on condition to emulate a startup fault condition, and a power on partial configuration can be selected for a power on condition to emulate steady state after initialization has been performed.

In one aspect, during emulation preparation process 300, power domain control signals generated by power controller 312 can be adapted for use by configuration controller 362. For example, the power domain control signals that are generated by power controller 312 can be routed or otherwise provided to configuration controller 362. In this manner, the same conditions that cause power controller 312 to power off or power on a given power domain can be used to cause configuration controller 362 to partially reconfigure the corresponding reconfigurable regions to emulate power on and/or power off conditions.

As pictured in FIG. 3, power controller 312 is also implemented in region 304-2 of IC 360. The power domain control signals generated by power controller 312, however, are routed to configuration controller 362 instead of switches that, in IC 310, are responsible for turning power on and/or off for power domains 306-1 and 308-1. In this manner, the power domain control signals are adapted for use by configuration controller 362 to control partial reconfiguration of reconfigurable regions 306-2 and 308-2. It should be appreciated that in cases where power controller 312 is not located within IC 310, the power domain control signals still can be provided to the configuration controller 362 whether configuration controller 362 is located within IC 360 or external thereto.

Figure 4:
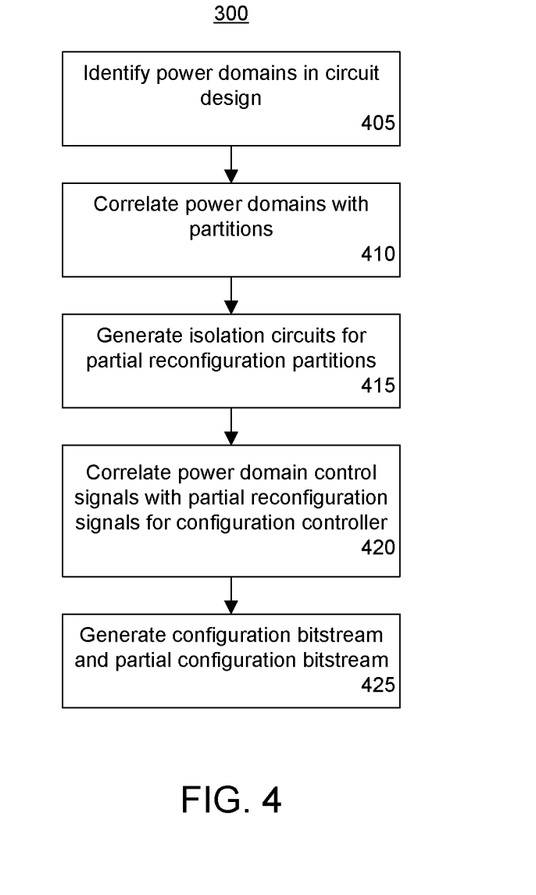
FIG. 4 is a flow chart illustrating an exemplary method of emulating power domains.

FIG. 4 is a flow chart illustrating an exemplary method 400 of emulating power domains. More particularly, method 400 illustrates an exemplary implementation of emulation preparation process 300 described with reference to FIG. 3. Accordingly, method 400 can be performed using a data processing system as described with reference to emulation system 200 of FIG. 2. As described, a data processing system can execute suitable software such as an EDA application.

Method 400 can begin in a state where a circuit design is loaded into the data processing system. The circuit design can specify at least two power domains. In this example, the circuit design includes two power domains. The first power domain is static. The second power domain is dynamic. It should be appreciated that the number of power domains used in the example of FIG. 4 is for purposes of illustration only and is not intended as a limitation.

Accordingly, in block 405, the data processing system identifies each of the power domains in the circuit design. Power domains can be specified by the user, determined by identifying particular indicators within the circuit design, from an analysis of the power signals distributed to elements in the circuit design, and/or using another technique.

In block 410, the data processing system correlates the power domains with partitions. As noted, in one aspect, a static power domain of the circuit design is associated with a partition of the circuit design for which partial reconfiguration is not performed. Each power domain that is dynamic is associated, or correlated, with a partial reconfiguration partition. For example, the data processing system can insert any necessary identifiers or program code into the circuit design indicating that the partition is a partial reconfiguration partition.

In block 415, the data processing system can generate isolation circuits for the partial reconfiguration partitions. For example, the data processing system can modify the circuit design to include hardware description for the necessary isolation circuitry.

In block 420, the data processing system can correlate the power domain control signals with partial reconfiguration signals for the configuration controller. The power domain control signals generated by the power controller are routed to the configuration controller. Any additional circuitry needed for evaluating, decoding, and/or interpreting a state from the power domain control signals and translating such state to partial reconfiguration operations for the configuration controller can be added.

As such, for any of the power domains, the same condition that causes the power controller to power off the power domain will cause the configuration controller to partially reconfigure the corresponding reconfigurable region with a power off partial configuration bitstream. The same condition that causes the power domain to begin a startup process, e.g., a power on condition, will cause the configuration controller to partially reconfigure the corresponding reconfigurable region with a startup partial configuration bitstream to emulate a startup fault condition. In another aspect, if a user does not wish to emulate the startup fault condition for a power domain, the power on condition can cause the configuration controller to partially reconfigure the reconfigurable region with a power on partial configuration bitstream.

In block 425, the data processing system generates the configuration bitstream and any partial configuration bitstreams. The data processing system generates one or more partial configuration bitstreams for each of the partial reconfiguration partitions. Configuration data for the partition corresponding to the static power domain is also generated, e.g., as part of the configuration bitstream.

The configuration bitstream specifies configuration data for the entire circuit design. As such, the configuration bitstream specifies circuitry for the static power domain and an initial operating state for each of the reconfigurable regions. Typically, each reconfigurable region is implemented in a power on state after startup. It should be appreciated, however, that if desired, the initial state of one or more reconfigurable regions can be a power off state that can be specified by the configuration bitstream.

Figure 5:
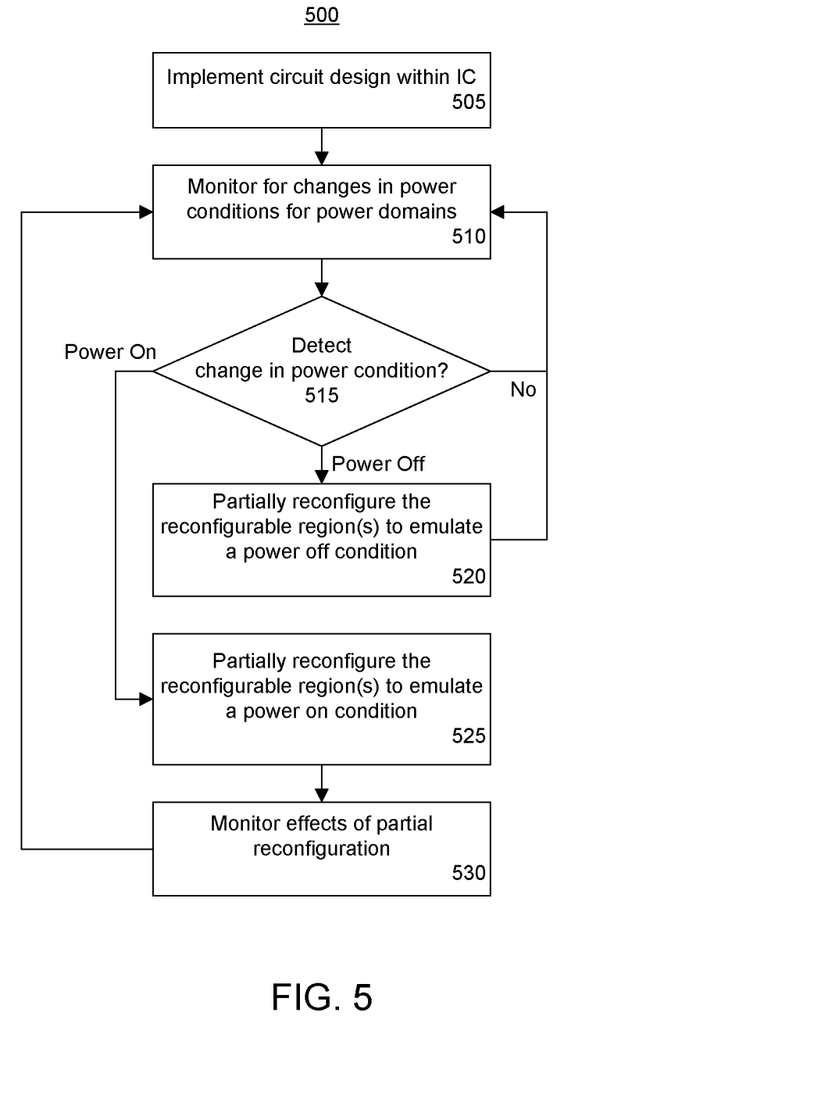
FIG. 5 is a flow chart illustrating another exemplary method of emulating power domains.

FIG. 5 is a flow chart illustrating another exemplary method 500 of emulating power domains. Method 500 can be implemented by emulation system 200 described with reference to FIG. 2. While method 500 is illustrated and described, at least in part, as being sequential in nature, it should be appreciated that power on conditions and/or power off conditions for one or more reconfigurable regions may occur sequentially or concurrently according to the testing that is performed. As such, the configuration controller can initiate partial reconfiguration of the reconfigurable regions for which power on conditions and/or power off conditions are detected as required, e.g., concurrently, serially, or the like. Accordingly, method 500 is provided for purposes of example only and is not intended to be limited to only a serial or only a concurrent (or parallel) implementation.

In block 505, the circuit design is implemented with the IC. The IC is loaded with the configuration bitstream. In one aspect, the data processing system sends the IC the configuration bitstream and any generated partial configuration bitstreams. For example, the data processing system can send the configuration bitstream and the partial configuration bitstreams to a memory located on the emulation platform or another memory that is external to the IC. The configuration controller can access the memory. As such, the configuration controller can read the configuration bitstream and/or any partial configuration bitstreams as may be required and load such bitstreams into configuration memory cells of the IC thereby implementing the selected bitstream or bitstreams. For purposes of explanation, it is assumed that both the static power domain and the dynamic power domain are initially powered on.

As part of configuring the IC, the various power domain control signals generated by the power controller are coupled to the configuration controller. As such, the configuration controller, once the IC is fully configured with the configuration bitstream, is ready to emulate power domains using the reconfigurable regions of the IC. Accordingly, in block 510, the configuration controller monitors for changes in power conditions for power domains. For example, the configuration controller monitors the power domain control signals for a power off condition and/or a power on condition for one or more power domains, now emulated by reconfigurable regions of the IC. The power off condition and the power on condition are detected from the power domain control signals.

In block 515, the configuration controller determines whether a change in a power condition has been detected. For example, the configuration controller determines whether one or more power off conditions or one or more power on conditions have been detected. If neither a power on condition nor a power off condition is detected for a reconfigurable region of the IC, method 500 loops back to block 510 to continue monitoring. If one or more power off conditions are detected for reconfigurable regions of the IC, method 500 proceeds to block 520. If one or more power on conditions are detected for reconfigurable regions of the IC, method 500 continues to block 525.

In block 520, the configuration controller partially reconfigures each reconfigurable region of the IC that is to emulate a power off condition and for which the power off condition is detected. The configuration controller loads the power off partial configuration bitstream for each reconfigurable region into the IC. After block 520, method 500 loops back to block 510 to continue monitoring for further power on conditions and/or power off conditions.

While the reconfigurable region(s) is loaded with the power off partial configuration bitstream, the other still active region (or regions) continue to operate and can be tested. As discussed, isolation circuitry implemented within the IC for the reconfigurable region ensures that the other portions of the IC can continue to operate while the reconfigurable region is loaded with the power off partial configuration bitstream.

In block 525, when one or more power on conditions are detected, the configuration controller partially reconfigures each reconfigurable region of the IC that is to emulate a power on condition. For example, each reconfigurable region that is to emulate a power on condition can emulate a power on state without a startup fault condition or emulate a power on state with a startup fault condition. The configuration controller loads the startup partial configuration bitstream into the IC for each reconfigurable region that is to emulate a startup fault condition. The configuration controller loads the power on partial configuration bitstream, instead of the startup partial configuration bitstream, into the IC for each reconfigurable region that is to emulate a power on state without a startup fault condition.

As noted, while the detection of power on conditions and/or power off conditions and the corresponding partial reconfiguration steps are presented as an "either or situation," e.g., serially, it should be appreciated that the configuration controller may detect one or more power on conditions concurrently with one or more power off conditions. As such, for any given partial reconfiguration operation, the configuration controller may load one or more reconfigurable regions with power on and/or startup partial configuration bitstreams and one or more other reconfigurable regions with power off partial configuration bitstreams. As noted, such loading can be performed concurrently or serially.

In block 530, the effects of partial reconfiguration are monitored. More particularly, the effects of the power on condition on other portions of the IC can be monitored whether a startup fault condition is emulated or a power on state without a startup fault condition is emulated. In the case of a reconfigurable region configured using a startup partial configuration bitstream, for example, the effects of the startup fault condition are observed. Since the reconfigurable region(s) has been partially reconfigured with the startup partial configuration bitstream, the effects of the memory values upon one or more other regions of the IC are observed. The behavior of the IC, when the startup partial configuration bitstream is loaded, emulates the behavior of an IC implementing the circuit design when the isolation circuitry for the dynamic power domain is malfunctioning. In the case of a reconfigurable region configured using a power on partial configuration bitstream, for example, the effects of returning the reconfigurable region to a powered on state without emulation of a startup fault condition are observed.

The IC can be tested using any of a variety of known testing techniques. For example, probes or other signal and/or data capture circuits can be inserted into the circuit design and implemented within the IC to capture and/or determine one or more signals and/or memory values. The determined values can be output to a data processing system as described with reference to FIG. 2 for analysis. For example, the determined values from the emulation can be compared with expected values to determine whether a mismatch exists, whether the emulated failure of isolation circuitry adversely effects any portion of the IC, or whether the emulated failure induces an unexpected state within another portion of the IC. After block 530, method 500 can loop back to block 510 to continue operation and emulation.

It should be appreciated that the monitoring and testing described with reference to block 530 also can be performed to monitor the effects of a power off condition on one or more portions of the IC. For example, after block 520, if desired, method 500 can continue to block 530 to monitor effects of the emulated power off condition on one or more other portions of the IC.

Method 500 illustrates a general process that can be implemented by the configuration controller. In one aspect, the configuration controller can be located external to the IC that emulates the power domains, e.g., on a same platform, circuit board, or the like. In that case, the configuration controller, being external, can load configuration bitstreams via the Joint Test Action Group (JTAG) port of the IC or through another interface of the IC.

In some cases, the power on and/or power off process that occurs in the actual circuit design that is being emulated is a single cycle event. In other cases, the power on and/or power off process is a multi-cycle event. Accordingly, in another aspect, the configuration controller can control or stop the system clock of the IC while partial reconfiguration of one or more reconfigurable regions is taking place. Once the partial reconfiguration operation(s) are complete, the clock can be started so that the reconfiguration takes the same number of clock cycles as the power on and/or power off of a power domain in the IC being emulated.

As noted and if desired, one or more reconfigurable regions can be partially reconfigured using the power on partial configuration bitstream instead of the startup partial configuration bitstream. Such a technique can be useful when one wishes to test isolation circuits for a particular power domain as opposed to all power domains. Thus, those reconfigurable regions (dynamic power domains) for which failure of isolation circuits are to be emulated are partially reconfigured using a startup partial configuration bitstream responsive to a power on condition after emulation of a power off state. Those reconfigurable regions (dynamic power domains) for which failure of the isolation circuits are not to be emulated are partially reconfigured with a power on partial reconfiguration bitstream after emulation of a power off state.

For purposes of explanation, specific nomenclature is set forth to provide a thorough understanding of the various inventive concepts disclosed herein. The terminology used herein, however, is for the purpose of describing particular examples only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects disclosed within this specification can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a device such as a computer program product, which includes all the features enabling the implementation of the methods described herein. The device can include a data storage medium, e.g., a non-transitory computer-usable or computer-readable medium, storing program code that, when loaded and executed in a system including a processor, causes the system to initiate and/or perform at least a portion of the functions or operations described within this specification. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to the various examples disclosed herein. In this regard, each block in the flowchart or block diagrams may represent a module, segment, or portion of code, which includes one or more executable instructions for implementing the specified logical function(s).

It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this specification, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

The features disclosed within this specification can be embodied in other forms without departing from the spirit or essential attributes thereof. Accordingly, reference should be made to the following claims, rather than to the foregoing specification, as indicating the scope of such features and implementations.

What is claimed is:
1. A method, comprising:
correlating, using a processor, a selected power domain of a circuit design comprising a plurality of power domains with a partial reconfiguration partition;
implementing the circuit design within an integrated circuit;

wherein the partial reconfiguration partition is implemented within a reconfigurable region of the integrated circuit; and emulating a power off state for the selected power domain of the circuit design by partially reconfiguring the reconfigurable region of the integrated circuit.

2. The method of claim 1, wherein the reconfigurable region of the integrated circuit implements circuitry of the power domain, specified by the configuration bitstream, in a powered on state.

3. The method of claim 2, wherein emulating the power off state comprises loading a power off partial configuration bitstream into the integrated circuit for the reconfigurable region.

4. The method of claim 3, further comprising:
emulating a startup fault condition for the selected power domain after emulating the power off state by partially reconfiguring the reconfigurable region of the integrated circuit; and
testing at least a portion of the integrated circuit.

5. The method of claim 4, wherein emulating the startup fault condition comprises loading a startup partial configuration bitstream into the integrated circuit for the reconfigurable region.

6. The method of claim 4, wherein the startup partial configuration bitstream specifies same circuitry for the reconfigurable region as the configuration bitstream with at least one memory element of the circuit design within the reconfigurable region storing a randomly selected value.

7. The method of claim 4, wherein the startup partial configuration bitstream specifies same circuitry for the reconfigurable region as the configuration bitstream with a memory element of the circuit design within the reconfigurable region storing a value that differs from the value of the memory element set by the configuration bitstream.

8. The method of claim 1, wherein implementing the circuit design within the integrated circuit comprises connecting a power domain control signal generated by a power controller of the circuit design to a configuration controller of the integrated circuit.

9. An integrated circuit, comprising:
a configuration controller that loads, within the integrated circuit, a configuration bitstream for a circuit design; and
a reconfigurable region comprising programmable circuitry that is programmed by the configuration controller to implement circuitry of a power domain specified by the configuration bitstream;
wherein the configuration controller emulates a power off state for the power domain of the circuit design by partially reconfiguring the reconfigurable region of the integrated circuit.

10. The integrated circuit of claim 9, wherein:
the configuration controller is coupled to a power domain control signal; and
the configuration controller loads a power off partial configuration bitstream for the reconfigurable region responsive to the power domain control signal indicating a power off condition for the power domain.

11. The integrated circuit of claim 9, wherein:
the configuration controller is coupled to a power domain control signal; and
the configuration controller loads a startup partial configuration bitstream for the reconfigurable region responsive to the power domain control signal indicating a power on condition for the power domain.

12. The integrated circuit of claim 9, wherein:
the reconfigurable region of the integrated circuit implements circuitry of the power domain, specified by the configuration bitstream, in a powered on state; and
the configuration controller emulates a power off state by loading a power off partial configuration bitstream for the reconfigurable region into the integrated circuit.

13. The integrated circuit of claim 12, wherein the configuration controller emulates a startup fault condition for the power domain after emulating the power off state by partially reconfiguring the reconfigurable region of the integrated circuit.

14. The integrated circuit of claim 13, wherein the configuration controller emulates the startup fault condition for the power domain after the power off state by loading a startup partial configuration bitstream for the reconfigurable region into the integrated circuit.

15. The integrated circuit of claim 14, wherein the startup partial configuration bitstream specifies same circuitry for the reconfigurable region as the configuration bitstream with at least one memory element of the circuit design within the reconfigurable region storing a randomly selected value.

16. The integrated circuit of claim 14, wherein the startup partial configuration bitstream specifies same circuitry for the reconfigurable region as the configuration bitstream with a memory element of the circuit design within the reconfigurable region storing a value that differs from the value of the memory element set by the configuration bitstream.

17. A system, comprising:
an integrated circuit comprising a reconfigurable region comprising programmable circuitry; and
a configuration controller coupled to the integrated circuit that loads, within the integrated circuit, a configuration bitstream for a circuit design;
wherein the reconfigurable region is programmed by the configuration controller to implement circuitry of a power domain specified by the configuration bitstream; and
wherein the configuration controller emulates a power off state for the power domain of the circuit design by partially reconfiguring the reconfigurable region of the integrated circuit.

18. The system of claim 17, wherein:
the configuration controller is coupled to a power domain control signal; and
the configuration controller loads a power off partial bitstream for the reconfigurable region responsive to the power domain control signal indicating a power off condition for the power domain.

19. The system of claim 18, wherein the configuration controller, responsive to a power domain control signal, loads a startup partial bitstream for the reconfigurable region.

20. The system of claim 19, wherein:
the reconfigurable region of the integrated circuit implements the power domain in a powered on state from the configuration bitstream; and
the startup partial configuration bitstream implements the same circuitry within the reconfigurable region as the configuration bitstream except for at least one memory element storing a value that is randomly selected.

* * * * *